US012753920B2

(12) United States Patent
Chlebovec

(10) Patent No.: US 12,753,920 B2
(45) Date of Patent: Oct. 6, 2026

(54) HOPPER FOR FEEDING BULK MATERIAL

(71) Applicant: Schenck Process Europe GmbH, Darmstadt (DE)

(72) Inventor: Michal Chlebovec, Poprad-Velka (SK)

(73) Assignee: Qlar Europe GmbH, Darmstadt (DE)

( * ) Notice: Subject to any disclaimer, the term of this patent is extended or adjusted under 35 U.S.C. 154(b) by 596 days.

(21) Appl. No.: 17/881,142

(22) Filed: Aug. 4, 2022

(65) Prior Publication Data

US 2022/0373173 A1 Nov. 24, 2022

Related U.S. Application Data

(63) Continuation of application No. PCT/EP2021/050337, filed on Jan. 11, 2021.

(30) Foreign Application Priority Data

Feb. 5, 2020 (GB) ..................................... 2001556

(51) Int. Cl.

| | |
|---|---|
| ***F23G 5/44*** | (2006.01) |
| ***B65D 88/66*** | (2006.01) |
| ***B65G 11/02*** | (2006.01) |
| ***B65G 11/20*** | (2006.01) |

(52) U.S. Cl.

CPC ............. *F23G 5/444* (2013.01); *B65D 88/66* (2013.01); *B65G 11/026* (2013.01); *B65G 11/206* (2013.01)

(58) Field of Classification Search

CPC ......... F23G 5/444; B65D 88/66; B65D 88/64; B65D 88/26; B65D 88/28; B65D 88/54; B65G 11/026; B65G 11/206; B65G 65/425; B65G 65/46; B65G 65/4881; B65G 3/04

See application file for complete search history.

(56) References Cited

U.S. PATENT DOCUMENTS

| | | | | |
|---|---|---|---|---|
| 1,242,012 A * | 10/1917 | Lynch | .................... | B65D 88/28 52/197 |
| 2,319,177 A | 5/1943 | Wright | | |
| 3,155,542 A * | 11/1964 | Cordell | .................... | A01C 1/00 366/195 |
| 3,319,807 A * | 5/1967 | Van Raden | ........... | B28C 7/0061 414/269 |

(Continued)

FOREIGN PATENT DOCUMENTS

| | | |
|---|---|---|
| CN | 201245337 Y | 5/2009 |
| CN | 103159042 A | 6/2013 |

(Continued)

OTHER PUBLICATIONS

International Search Report dated Apr. 19, 2021 in corresponding application PCT/EP2021/050337.

(Continued)

*Primary Examiner* — Glenn F Myers

(74) *Attorney, Agent, or Firm* — Muncy, Geissler, Olds & Lowe, P.C.

(57) ABSTRACT

There is herein described an apparatus and method for feeding bulk material. More particularly, there is described an apparatus and method for feeding bulk material such as bulk solids which provides a constant and reliable feed of material.

22 Claims, 11 Drawing Sheets

(56) References Cited

U.S. PATENT DOCUMENTS

| | | | | | |
|---|---|---|---|---|---|
| 3,610,485 | A * | 10/1971 | Van Raden | B65D 88/64 | 105/247 |
| 4,125,970 | A | 11/1978 | Vidal | | |
| 4,266,900 | A * | 5/1981 | Rynyk | F23G 5/448 | 110/255 |
| 4,889,318 | A * | 12/1989 | Sisk | F16L 41/021 | 285/133.11 |
| 5,215,372 | A * | 6/1993 | Milstead | E01C 19/1072 | 209/373 |
| 6,355,904 | B1 * | 3/2002 | Batdorf | B09B 3/00 | 219/121.36 |
| 10,005,622 | B1 * | 6/2018 | Narsingh | B65G 47/18 | |
| 2009/0302065 | A1 | 12/2009 | Winsor | | |
| 2011/0127178 | A1 * | 6/2011 | Claussen | B65D 88/30 | 414/809 |
| 2012/0193357 | A1 | 8/2012 | Pleima | | |
| 2013/0010565 | A1 * | 1/2013 | Campbell | B65G 11/206 | 366/1 |
| 2015/0175348 | A1 * | 6/2015 | Southwell | B65D 90/587 | 222/1 |
| 2018/0305118 | A1 * | 10/2018 | Lucas | B65D 88/28 | |
| 2019/0119038 | A1 * | 4/2019 | Kornelsen | B65G 11/146 | |
| 2021/0061549 | A1 * | 3/2021 | Risser | B65G 69/08 | |

FOREIGN PATENT DOCUMENTS

| | | | |
|---|---|---|---|
| CN | 105730904 | A * | 7/2016 |
| CN | 106628688 | A | 5/2017 |
| CN | 110510327 | A | 11/2019 |
| EP | 0001576 | A1 | 5/1979 |
| JP | S5932690 | U | 2/1984 |
| JP | S60232329 | A | 11/1985 |
| JP | H10279004 | A | 10/1998 |
| JP | H114650 | A | 1/1999 |
| SU | 958266 | A1 | 9/1982 |

OTHER PUBLICATIONS

European Communication for European Application 21702163.3 mailed on May 19, 2025.

* cited by examiner

HOPPER FOR FEEDING BULK MATERIAL

This nonprovisional application is a continuation of International Application No. PCT/EP2021/050337, which was filed on Jan. 11, 2021, and which claims priority to Patent Application No. 2001556.6, which was filed in Great Britain on Feb. 5, 2020, and which are both herein incorporated by reference.

BACKGROUND OF THE INVENTION

Field of the Invention

The present invention relates to an apparatus and method for feeding bulk material. More particularly, the present invention relates to an apparatus in the form of a hopper and a method for feeding bulk and/or particulate material such as bulk solids which provides a constant and reliable feed of bulk material.

Description of the Background Art

There is a need in the technical field of feeding bulk material to provide an apparatus and method which provides a constant and reliable feed of material and overcomes inconsistent feeding of bulk material.

Prior art systems in the form of hoppers have consisted of apparatus with straight walls (i.e., vertical walls) and conical bottoms. The hoppers with straight vertical walls require high torque for agitators to empty the contents of the hopper. Such systems have been found to result in blockages (usually permanent) of the material which are commonly known as 'bridging blockages'. Not only does this lead to inconsistent feeding of material but also on some occasions requires mechanical cleaning between batches. Even when agitators are applied to such systems the agitators are not able to clear the blockage of material i.e. the bridging blockage.

The bridging of material provides a number of significant problems when feeding bulk material such as bulk solids in. The bridging of material creates the situation where in an outlet of the hopper there is no material which leads to incorrect feeding of a feeding/dosing trough. This results in the incorrect amount of material being fed to a further process downstream such as a burning process which then leads to further consequent problems such as an increase in CO peaks during the burning process. The burning process may, for example, be used to burn refuge waste such as household and/or industrial waste. Due to the inconsistent burning process other fuel then has to be added to the process which not only further complicates the running process but also adds some delay or miss-regulation to the process.

As indicated above, the potential bridge caused by the blockage of material increases the probability of CO peaks. The formed bridge has to be eliminated as soon as possible in view of the burning process such as using an agitator or providing further material into the hopper. This obviously leads to a complicated process and inevitably CO peaks during the burning process which are not only environmentally unfriendly but also lead to a very inefficient process.

A further problem caused by the blockage and bridging of material in prior art systems is that the blocked material can apply excessive torque demands on agitators located in the hopper and also reduces the amount of material which can be fed into the hopper.

SUMMARY OF THE INVENTION

It is therefore an object of the present invention to obviate or mitigate at least one or more of the aforementioned problems.

It is a further object of at least one aspect of the present invention to provide an apparatus and method for feeding bulk material in a consistent and reliable manner.

It is a yet further object of at least one aspect of the present invention to provide an apparatus in the form of a hopper and method for feeding bulk material which reduces the possibility of having permanent blockages of material in the hopper.

According to a first example of the present invention there is provided a hopper for feeding bulk material, the hopper comprising: a main body having an upper portion and a lower portion; an inlet located on an upper surface of the upper portion of the main body for bulk material to enter the hopper; an outlet located on a lower surface of the lower portion of the main body for bulk material to exit the hopper; the main body defining a substantially vertical passageway for bulk material to pass from the inlet down and substantially vertically through the outlet of the hopper; the upper portion of the main body having at least one or a plurality of panel surfaces which are inclined outwards from a centrally positioned substantially vertical axis passing through the center of the hopper from the inlet to the outlet in the direction of travel of the bulk material; the lower portion of the main body having at least one or a plurality of panel surfaces which are inclined inwards towards the substantial vertical axis passing through the center of the hopper from the inlet to the outlet in the direction of travel of the bulk material; wherein the hopper is capable of providing a substantially constant feed of bulk material through the outlet.

According to a second aspect of the present invention there is provided a hopper for feeding bulk material, the hopper comprising: a main body having an upper portion and a lower portion; an inlet located on an upper surface of the upper portion of the main body for bulk material to enter the hopper; an outlet located on a lower surface of the lower portion of the main body for bulk material to exit the hopper; the main body defining a substantially vertical passageway for bulk material to pass from the inlet down and substantially vertically through the outlet of the hopper; the upper portion of the main body having at least one or a plurality of substantially planar panel surfaces which are inclined outwards from a centrally positioned substantially vertical axis passing through the center of the hopper from the inlet to the outlet in the direction of travel of the bulk material; the lower portion of the main body having at least one or a plurality of substantially planar panel surfaces which are inclined inwards towards the substantial vertical axis passing through the center of the hopper from the inlet to the outlet in the direction of travel of the bulk material; wherein the hopper is capable of providing a substantially constant feed of bulk material through the outlet.

The present invention therefore relates to an apparatus in the form of a hopper and method for providing a constant and reliable feed of bulk material.

The bulk material to be conveyed by the hopper may be any type of type of bulk material. In particular embodiments, the material being conveyed may be household and/or industrial waste which is being sent for incineration. Alternatively, the bulk material being transferred may be any type of solid fuel (e.g. coal) or any other type of solid particulate material including powder or powder-like material.

The hopper may provide a feed of material for any type of conveying system.

The hopper preferably provides a reliable and constant or substantially constant feed of material and overcomes permanent blockages which are found in prior art systems.

A specific feature of the present invention is to use what is called 'negative angles' on surfaces on the upper portion of the hopper. This has been found to reduce the torque demands on agitators used to facilitate the flow of material and to also maximize the usable volume of the hopper. By using negative angles in the design of the hopper of the present invention has been found to reduce the torque demands by up to about 70% in the operation of the hopper and agitators.

Typically, bulk material may be fed into the inlet and passes through the substantially vertical passageway and out through the outlet.

In use, the hopper may be typically vertically or substantially vertically oriented to facilitate the flow of the bulk material through the hopper.

The inlet of the hopper may be located above or substantially above the outlet of the hopper. This facilitates the flow of material through the hopper.

Typically, the upper portion of the hopper may be longer in height extending down the central vertical axis of the hopper in the direction of travel of the bulk material than the lower portion of the hopper.

The upper portion of the hopper may, for example, be about 1-5 times or about 2-5 times the height of the lower portion of the hopper. Typically, the upper portion of the hopper may be at least about two or at least about three times the height of the lower portion of the hopper.

The upper and/or lower portions of the hopper may comprise at least one or a plurality of flat or substantially flat panels. The at least one or a plurality of panels in the upper and/or lower portions may be substantially flat and/or substantially planar.

The panels are intended to provide a smooth inner surface for material to pass through the hopper from the inlet to the outlet with the minimum amount of friction and/or resistance and to thereby prevent any blockages of material.

Preferably, both the upper and lower portions of the hopper may comprise at least one or a plurality of flat and/or substantially planar panels. The panels may be substantially flat and/or substantially planar.

In preferred embodiments, in the upper portion of the hopper there may be at least one or a series of flat and/or substantially flat and/or substantially planar panels. It is important to appreciate that a number of these panels are what is known in the art as 'negative angles'. By having 'negative angles' we mean that the panels extend outwards and away from a central axis 'Y' of the hopper as the bulk material travels from the inlet through and out of the outlet.

The panels may therefore typically extend outwards and point away from the exit outlet of the hopper.

Preferably, more than half or the majority of the panels forming the upper portion of the hopper extend outwards and away from a central axis 'Y' of the hopper as the bulk material travels from the inlet through and out of the outlet.

The panels forming the upper portion which extend outwards may be any of any suitable size and shape. For example, any type of polygon shapes may be used such as three-, four-, five- or six-sided shapes. Typically, the panels are flat or substantially flat and thereby form a flat smooth surface on the inside surface of the passageway passing through the hopper.

At least one or a plurality of panels forming the upper portion are therefore preferably inclined outwards from the central axis 'Y' in the direction of travel of the bulk material. The degree of inclination outwards from vertical axis 'Y' may range from about 2 degrees—about 45 degrees. A preferred degree of inclination outwards may be about 5 degrees—about 20 degrees.

Typically, access hatches may be located on the panels on the upper portion to provide access to the inside of the hopper. Personnel may therefore access the insider hopper for routine inspection.

In particular embodiments, there may be a combination of two larger six-sided panels and two smaller triangular panels which are inclined outwards from the central axis 'Y' of the hopper as the bulk material travels from the inlet through and out of the outlet. However, any suitable shapes and/or sizes of panels may be used.

The triangular panels may have a degree of inclination outwards from the central axis 'Y' in the direction of travel of the bulk material from about 2 degrees—about 45 degrees. A preferred degree of inclination outwards is about 5 degrees—about 20 degrees.

Preferably, in the upper portion of the hopper the majority of the panels extend outwards and away from the central axis 'Y' in the direction of travel of the bulk material. As indicated above, this is known as having panels at a 'negative angle'.

The hopper may be highly symmetrical in shape.

On the lower portion of the hopper there may be at least one or a plurality of agitators located on an inner surface of the hopper capable of providing a form of stirring and/or disrupting and/or wiping (i.e. scraping) action to dislodge material which may have become stuck and thereby at risk of forming a blockage. Alternatively, there may be at least one or a plurality of agitators located on an outer surface of the hopper capable of providing vibration and/or pulsing to the lower portion of the hopper. Any type of agitating or vibrating device may be used. This helps to facilitate the flow of material to the outlet of the hopper.

Typically, there may be two or more agitators located on opposite sides of the lower portion of the hopper. Any form or number of agitators may be used which are capable of dislodging and/or disrupting material on the inner sides of the hopper. The agitators may be located on an inner surface or an outer surface of the hopper.

The agitators may be located on a flat planar or substantially planar panel forming part of the lower portion.

In the lower portion of the hopper there may be at least one or a series of flat and/or substantially flat and/or substantially flat a planar panels.

In contrast to the majority of the panels in the upper portion of the hopper, at least one, the majority or all of the panels forming the lower portion of the hopper are inclined in towards the central axis of the hopper. The panels may therefore extend inwardly towards the central axis 'Y' in the direction of travel of the bulk material.

The agitators may preferably be substantially centrally located on the panels on which they are located.

The agitators may be located on any outer or inner surface location of the lower portion of the hopper. However, it is preferred that the agitators are located on panels which extend inwardly towards the central axis 'Y' in the direction of travel of the bulk material.

At least one, the majority or all of the panels forming the lower portion of the hopper may therefore extend inwardly towards the central axis 'Y' in the direction of travel of the bulk material. The panels may therefore be inclined in towards and direct bulk material to the outlet. The panels may therefore be described as being oriented at a 'positive angle'.

The degree of inclination of the panels forming the lower portion may be inclined in towards from a vertical central 'Y' axis ranging from about 10 degrees—about 45 degrees. A preferred degree of inclination inwards is about 20 degrees—about 40 degrees.

Typically, they may be at least one or a plurality of agitators located on the lower portion of the main body.

The agitators on the lower portion can be located on panels forming the lower portion which are inclined in towards the central axis of the hopper. The agitators may therefore be located on panels which extend inwardly towards the central axis 'Y' in the direction of travel of the bulk material. This may therefore be described as a 'positive angle'. The degree of inclination in towards from a vertical central 'Y' axis may range from about 10 degrees—about 45 degrees. A preferred degree of inclination inwards is about 20 degrees—about 40 degrees.

The agitators may be located on an inner surface of the hopper and may provide a form of stirring and/or disrupting and/or wiping (i.e. scraping) action to dislodge material which may have become stuck and thereby at risk of forming a blockage.

Alternatively, the agitators may be located on the outside of the hopper and may produce high frequency vibrations which prevent long-term blockages of the bulk material and aid the flow of the bulk material towards the outlet.

In some examples, all of the panels forming the lower portion of the hopper can extend inwardly towards the central axis 'Y' in the direction of travel of the bulk material. The degree of inclination in towards from a vertical central 'Y' axis may range from about 10 degrees—about 45 degrees. A preferred degree of inclination inwards is about 20 degrees—about 40 degrees.

A further preferred important feature of the hopper is that due to the inclined inwardly pointing panel surfaces in the lower portion of the hopper, the outlet is smaller than the cross-sectional area between the upper portion and the lower portion of the hopper.

Typically, the outlet may be about 30%-80% smaller than the cross-section of the area between the upper portion and the lower portion of the hopper. Typically, the outlet may be about 50% smaller than the cross-section of the area between the upper portion and the lower portion the hopper.

The purpose of the inwardly directed panels on the lower portion not only facilitates the agitation process but also means that the bulk material is not perpendicular to the force of the agitators. This means that the effectiveness of the agitation is increased and has been found to be significantly effective in preventing permanent blockages in the hopper.

A potential function of the hopper is to act as a short-term storage or so-called buffer system to eliminate fluctuations in the amount/volume of material being fed and to avoid delays of any suitable type of feed system.

A further specific advantage of the hopper is that by using a combination of the outwardly inclined panels in the upper portion and the inwardly inclined panels in the lower portion this maximizes the volume capacity of the hopper in comparison to prior art hoppers with traditional and simple vertical sides. Moreover, due to the increase in volume capacity, this allows more efficient use of space on the conveying line and also allows lower manufacturing costs.

A further advantage of the hopper is that where substantially all or preferably all of the panels forming the outer body of the hopper are all flat or substantially flat this reduces manufacturing costs and also facilitates ease of manufacture.

The flat surfaces are also highly effective in preventing blockages in the flow of the bulk material in the passageway passing through the center of the hopper. It is preferred that all surfaces in the passageway passing through the center of the hopper are flat or substantially flat and also smooth. This prevents any material forming blockages.

Furthermore, by reducing the material pressure on the agitators with the inclined walls in the lower portion has been found to improve the lifetime of the agitators and to also allow more efficient removal of bulk material from the hopper.

The hopper is designed to provide sufficient volume for short time storage of bulk material in a range of feeding devices. For example, the amount of bulk material held may range from about 1 $m^3$ to about 50 $m^3$.

In some examples all of the panels used in the construction of the hopper can be flat or substantially flat and/or substantially planar and thereby form a flat and/or smooth surface for the passageway passing through the center of the hopper. This facilitates both manufacture and reduces cost.

Although any suitable material may be used for the construction of the panels sheet metal and/or composite material and/or alloy may be a typically preferred option. The panels may be of a typically a substantially thin construction such as about 1-20 mm in thickness.

The hopper of the present invention may also be connected to any form of conveying system such as mechanical conveying system. The conveying systems which they may be connected may comprise conveying screws which may be driven by a motor or any other type of drive means.

In use, bulk material may initially be fed into the inlet of the hopper. As indicated above, any type of bulk material may be used. The bulk material may then enter the upper portion of the hopper. As explained above, at least one or a majority of the panels in the upper portion of the hopper may typically extend and may be inclined outwards from the central axis 'Y' in the direction of travel of the bulk material. This has been found to be an important feature in preventing potential bridges and blockages in the hopper.

The bulk material may then pass into the lower portion of the hopper where at least one or a majority of the panels may extend inwardly towards the central axis 'Y' in the direction of travel of the bulk material. In combination with the stirring and/or disrupting and/or wiping (i.e. scraping) and/or vibrations provided by the agitators such an arrangement has been found to be highly effective in preventing blockages and thereby providing a constant and reliable feed of bulk material.

A further advantage is that the load and torque exerted on the agitators may be significantly reduced by up to about 70% in comparison to hoppers with vertical straight sides. Such a system has also been found to maximize the available volume of material which can be inserted into the hopper.

By preventing any form of blockage in the hopper this enables the time spent for bulk material in the hopper to be kept to a minimum thereby increasing reliability and preventing forms of permanent blockage. Such a system also ensures a constant and reliable feed to subsequent processing systems such as a burning process for household and/or industrial waste.

According to a third aspect of the present invention there is provided a method of providing a substantially constant feed of bulk material, said method comprising: providing a main body having an upper portion and a lower portion;

providing an inlet located on an upper surface of the upper portion of the main body for bulk material to enter the hopper; providing an outlet located on a lower surface of the lower portion of the main body for bulk material to exit the hopper; the main body defining a substantially vertical passageway for bulk material to pass from the inlet down and substantially vertically through the outlet of the hopper; the upper portion of the main body having at least one or a plurality of panel surfaces which are inclined outwards from a centrally positioned substantially vertical axis passing through the center of the hopper from the inlet to the outlet in the direction of travel of the bulk material; and the lower portion of the main body having at least one or a plurality of panel surfaces which are inclined inwards towards the substantial vertical axis passing through the center of the hopper from the inlet to the outlet in the direction of travel of the bulk material.

According to a fourth aspect of the present invention there is provided a method of providing a substantially constant feed of bulk material, said method comprising: providing a main body having an upper portion and a lower portion; providing an inlet located on an upper surface of the upper portion of the main body for bulk material to enter the hopper; providing an outlet located on a lower surface of the lower portion of the main body for bulk material to exit the hopper; the main body defining a substantially vertical passageway for bulk material to pass from the inlet down and substantially vertically through the outlet of the hopper; the upper portion of the main body having at least one or a plurality of substantially planar panel surfaces which are inclined outwards from a centrally positioned substantially vertical axis passing through the center of the hopper from the inlet to the outlet in the direction of travel of the bulk material; and the lower portion of the main body having at least one or a plurality of substantially planar panel surfaces which are inclined inwards towards the substantial vertical axis passing through the center of the hopper from the inlet to the outlet in the direction of travel of the bulk material.

According to fifth aspect of the present invention there is provided use of the hopper defined in the first and second aspect for providing a substantially constant feed of bulk material.

According to sixth aspect of the present invention there is provided a conveying system comprising a hopper as defined in the first and second aspect.

The hopper may be used to provide a constant and/or reliable feed of material to the conveying system.

The conveying system may be any suitable type of conveying system.

For example, the conveying system may be part of a system for burning household and/or industrial waste.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
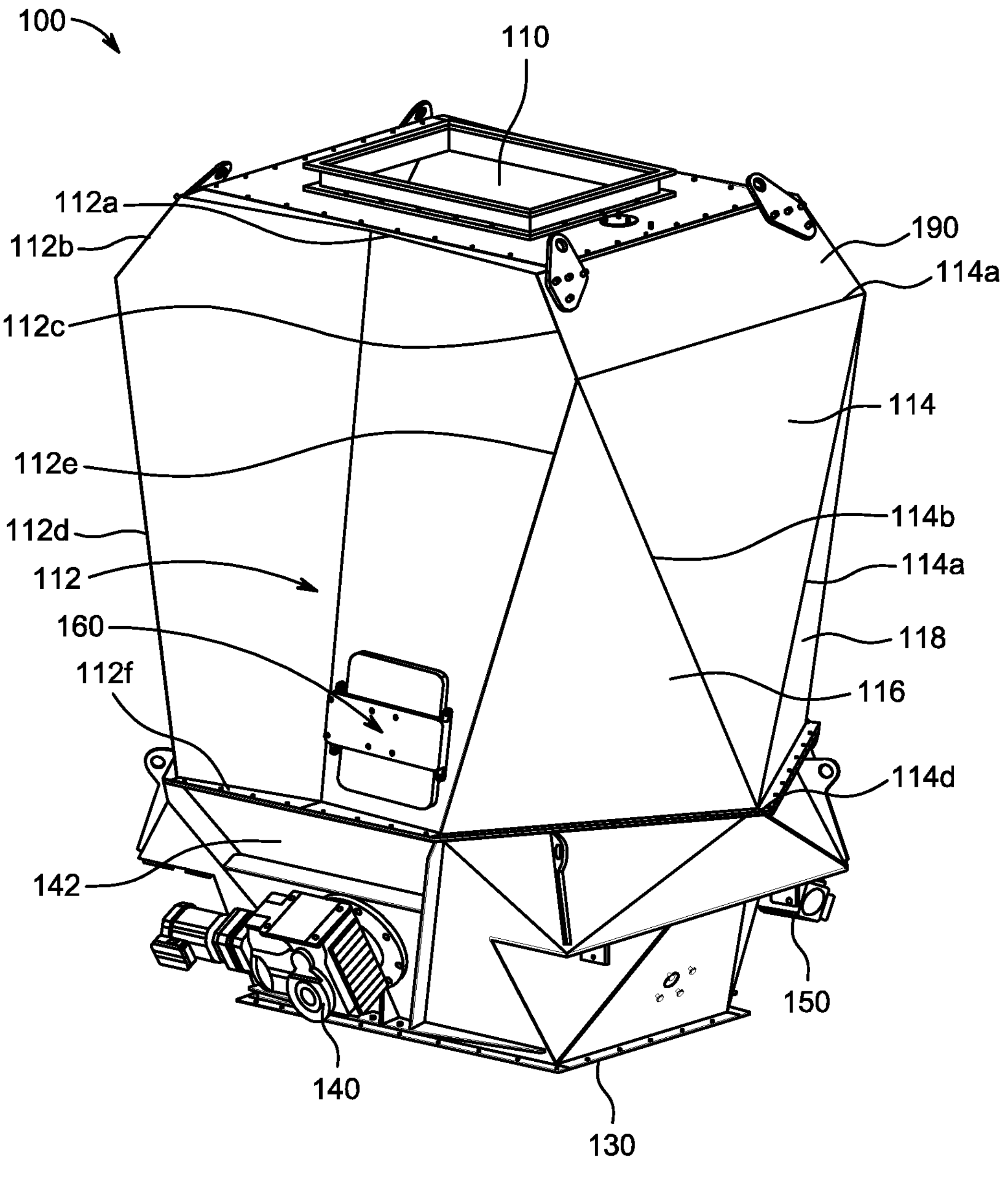
FIG. 1 is a perspective view of a hopper according to an embodiment of the present invention.

The present invention relates to an apparatus and method for feeding bulk material which provides a constant and reliable feed of bulk material. The bulk material may be any type of type of bulk and/or particulate material. In particular embodiments, the material being conveyed may be in the process of being sent for incineration such as household and/or industrial waste. Furthermore, the bulk material being transferred may be any type of solid fuel (e.g. coal) or any other solid material including powder or powder-like material. The bulk material may also include any type of foodstuff in a solid and/or powder form.

FIGS. 1 to 11 show a range of representations and views of a hopper generally designated 100 according to the present invention. The hopper 100 feeds bulk material and is intended to overcome any problems associated with prior art systems with potential bridging in the system causing permanent blockages in the transportation of the bulk material.

A specific feature of the present invention is to use what is called 'negative angles' on main surfaces of the hopper 100. This has been found to reduce the torque demands on agitators used to facilitate the flow of material and to also maximize the usable volume of the hopper 100. These are specific technical advantages over the prior art devices which use vertical straight walls and conical bottoms for their hopper designs. Such prior art designs have been found to lead to permanent blockages in the flow of bulk material and to also lead to exerting excessive torque demands on the agitators. By using negative angles in the design of the hopper of the present invention has been found to reduce the torque demands by up to about 70% in the operation of the hopper and agitators.

Referring to FIGS. 1 to 11 a hopper 100 is shown to have an inlet 110 located on an upper surface of the hopper 100 and an outlet 130 located on a lower surface of the hopper 100. Bulk material will therefore be fed into inlet 110 and pass through a central passageway 111 down and out through the outlet 130. The central passageway 111 is clearly shown in the cross-sectional view of FIG. 10. FIGS. 5 to 8 and 10 also clearly show a central vertical axis 'Y' extending through the center of the hopper 100.

The hopper 100 as clearly shown in FIGS. 5 to 8 and 11 has an upper portion identified by reference numeral CA' and a lower portion identified by reference numeral CB'. The upper portion 'A' is longer in height extending down the central vertical 'Y' axis of the hopper 100 than the lower portion CB'. The upper portion CA' is, for example, about 1-5 times or about 2-5 times the height of the lower portion CB' and typically at least about double or at least three times the height of the lower portion CB'.

We now refer to the upper portion 'A' of the hopper 100.

In the upper portion 'A' of the hopper 100 is shown a series of flat or substantially flat panels. It is important to appreciate that a number of these panels are what is known in the art as being oriented with 'negative angles'. By having 'negative angles' we mean that the panels extend outwards and away from a central axis 'Y' of the hopper 100 in the direction of travel as the bulk material travels from the inlet 110 through and out of the outlet 130. The panels therefore extend outwards and point away from the exit outlet 130 of the hopper 100 in the direction of travel of the bulk material.

FIG. 1 shows that in the upper portion CA' of the hopper 100 there is a negatively inclined flat or substantially flat panel 112 which points outwards and away from the central axis 'Y' in the direction of travel of the bulk material. The panel 112 therefore points outwards and away from the exit outlet 130 in the direction of travel of the bulk material. The flat panel 112 is also clearly shown in FIG. 5.

Figure 5:
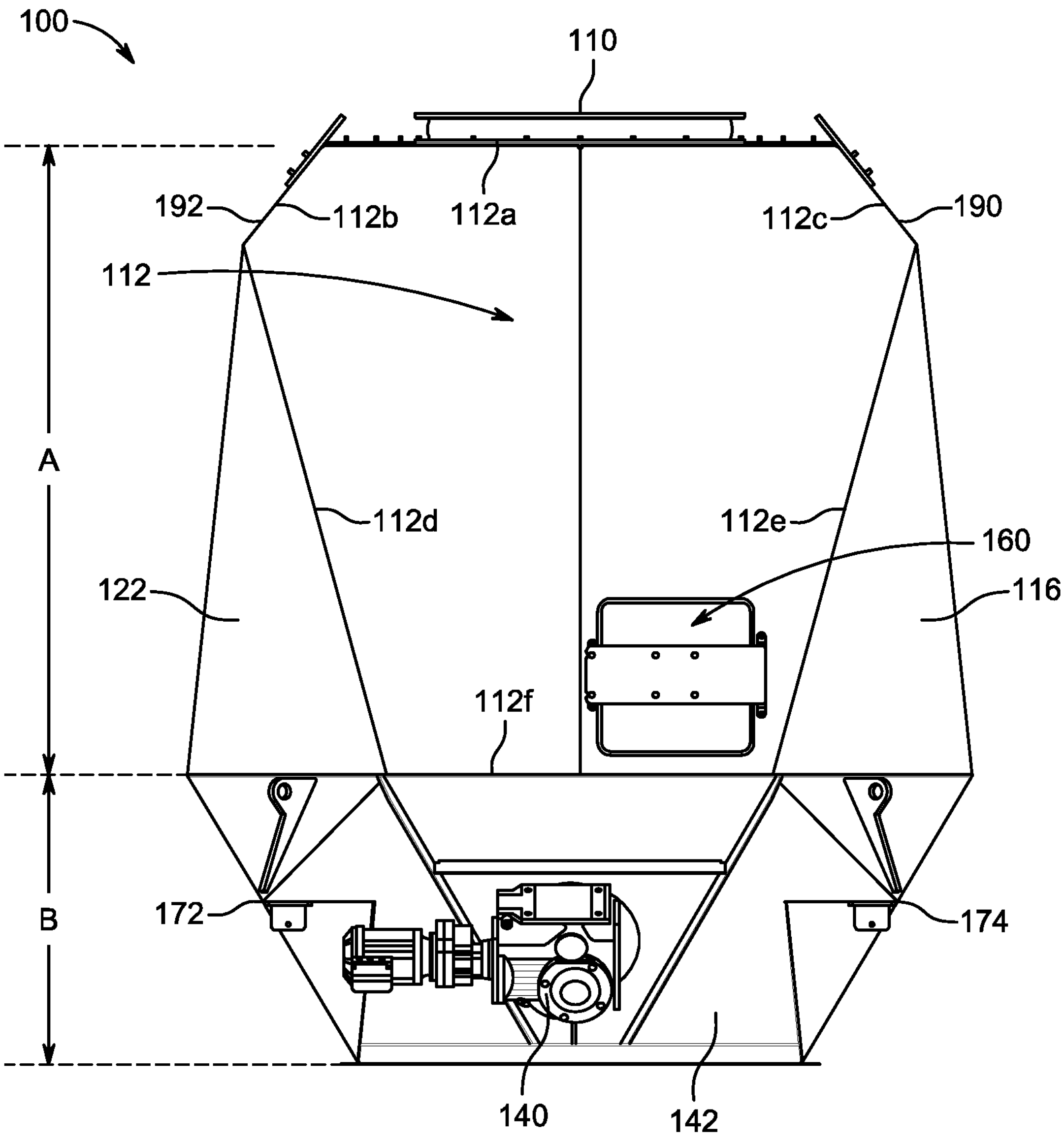
FIG. 5 is a front view of the hopper shown in FIGS. 1 to 4 according to an embodiment of the present invention.

The flat panel 112 comprises six sides 112*a*, 112*b*, 112*c*, 112*d*, 112*e*, 112*f*. As shown in FIGS. 1 and 5, side 192*a* extends along the upper surface of the hopper 100 and side 112*f* extends along the lower end of the upper portion 'A' of the hopper 100. Sides 112*b*, 112*c* are significantly shorter than sides 112*d*, 112*e*. Using sides 112*d*, 112*e* the flat panel 112 tapers down and reduces from a wider length at side 112*a* down to a shorter length at side 112*f*. Importantly, the panel 112 is inclined outwards from the central axis 'Y' in the direction of travel of the bulk material. The degree of inclination outwards from the vertical axis 'Y' may range from about 2 degree—about 45 degrees. A preferred degree of inclination outwards is about 5 degrees—about 20 degrees.

FIGS. 1 and 5 also clearly show that there is an access hatch 160 located on the panel 112. The access hatch 160 is an optional feature and allows access to the inside of the hopper 100 for any form of routine maintenance.

Figure 4:
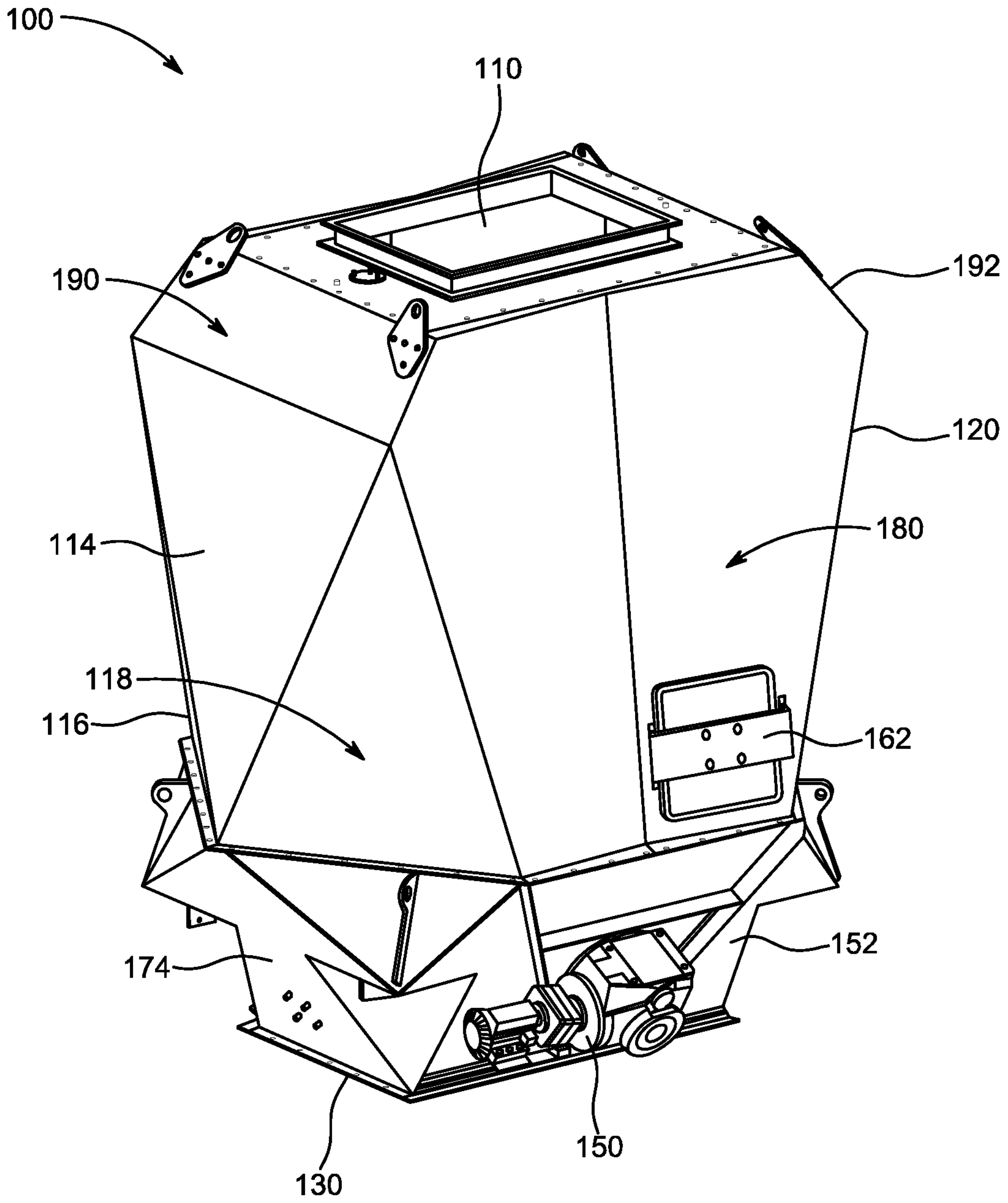
FIG. 4 is a further view of the hopper shown in FIG. 3 rotated by 180° around a vertical axis according to an embodiment of the present invention.
Figure 7:
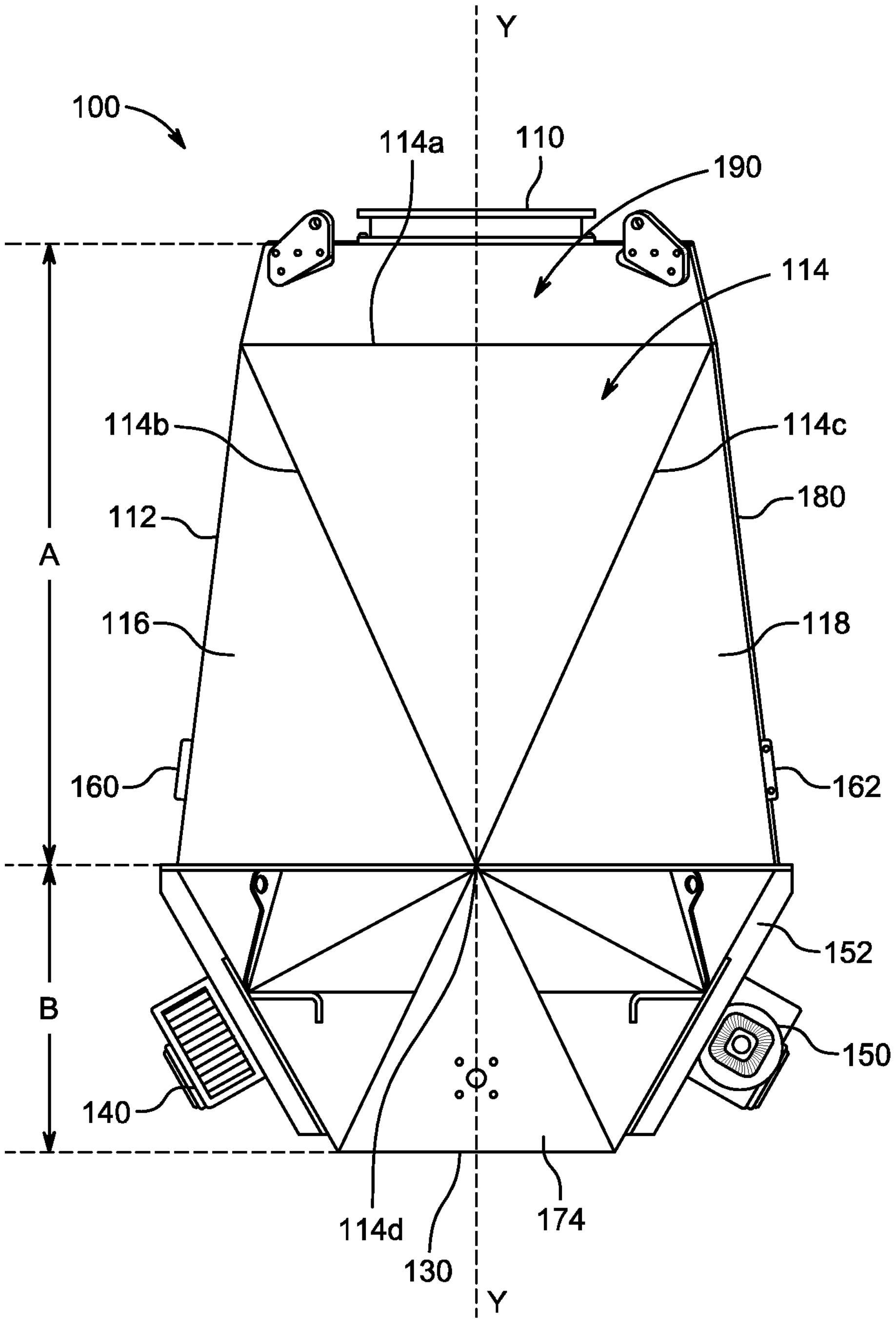
FIG. 7 is a side view of the hopper shown in FIGS. 1 to 6 according to an embodiment of the present invention.

FIGS. 1, 4 and 7 show a side of the hopper 100. The side of the hopper 100 is mainly made up of three triangular areas which are in a series of panels 114, 116, 118. It is important to note that panel 114 similar to panel 112 points outwards and away from the central axis 'Y' in the direction of travel of the bulk material.

Panel 114 comprises a side 114*a* located up towards the inlet 110 and two sides 114*b*, 114*c* extending and tapering down to a point 114*d* at the intersection between the upper portion 'A' and the lower portion 'B'. There is also shown in the side a flat panel 190 extending along the side 114*a* of the triangular panel 114.

The triangular panel 114 has a degree of inclination outwards from the central axis 'Y' in the direction of travel of the bulk material from about 2 degrees—about 45 degrees. A preferred degree of inclination outwards is about 5 degrees—about 20 degrees.

The panel 190 also extends outwardly away from the central axis 'Y' in the direction of travel of the bulk material. The degree of inclination outwards from the central axis 'Y' in the direction of travel of the bulk material ranges from about 2 degree—about 45 degrees. A preferred degree of inclination outwards is about 5 degrees—about 20 degrees.

Figure 2:
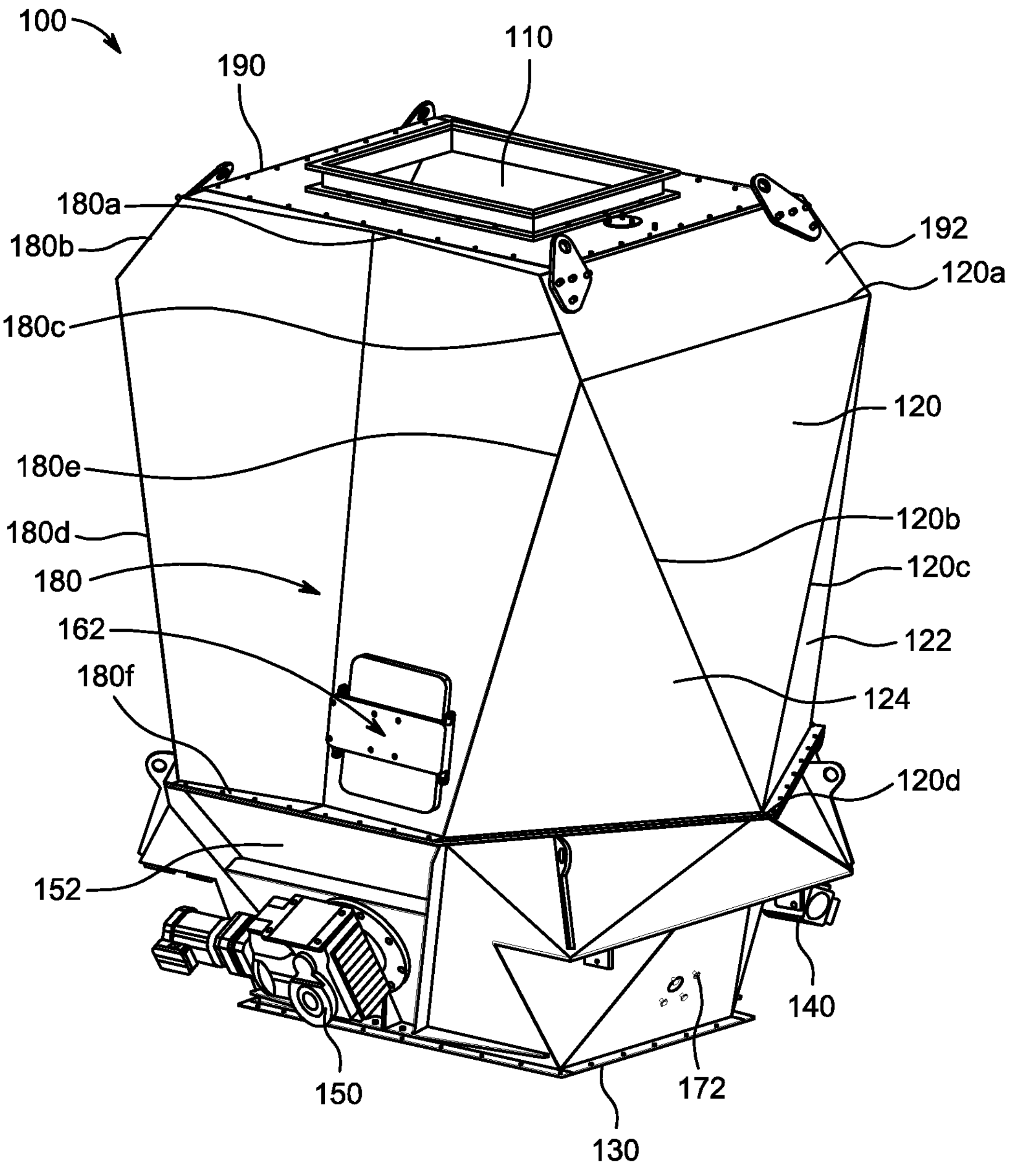
FIG. 2 is a further perspective view of the hopper shown in FIG. 1 rotated 180° around a vertical axis according to an embodiment of the present invention.
Figure 3:
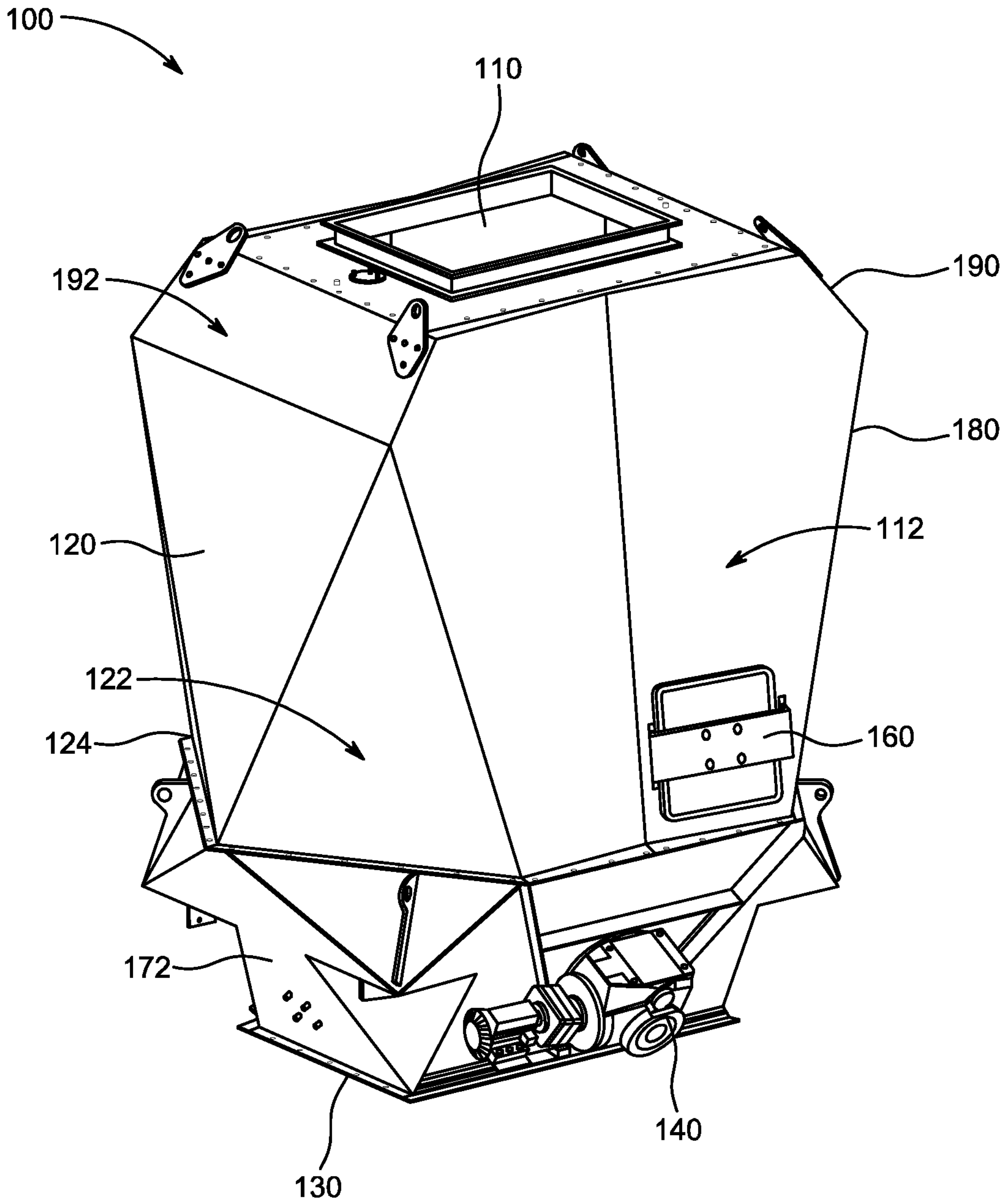
FIG. 3 is a further perspective view of the hopper shown in FIGS. 1 and 2 according to an embodiment of the present invention.
Figure 6:
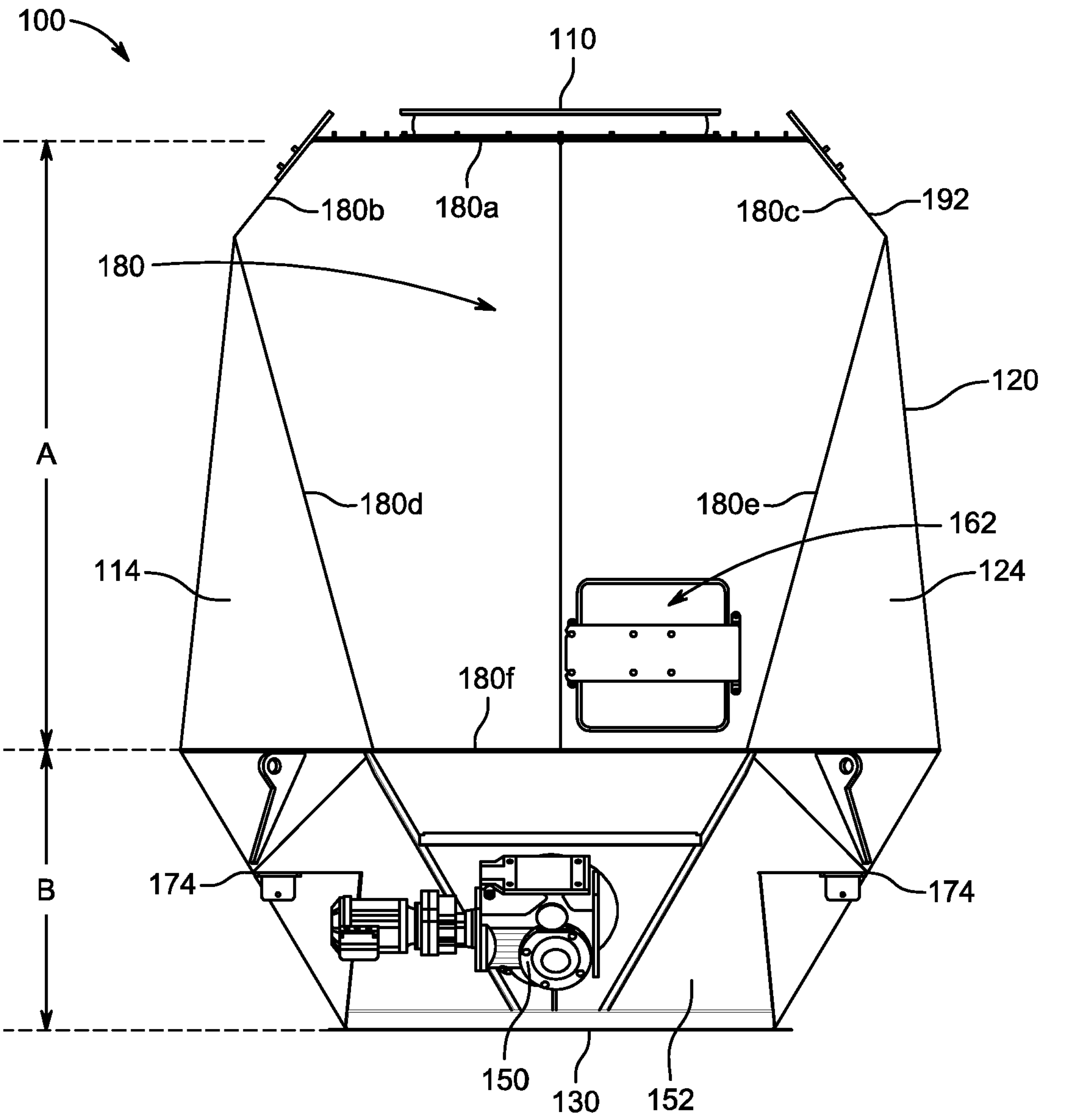
FIG. 6 is a view of the hopper shown in FIGS. 1 to 5 according to an embodiment of the present invention.

The hopper 100 is highly symmetrical in shape and FIGS. 2, 4 and 6 show the other side. FIGS. 2, 4 and 6 clearly show that there is a panel 180 which is the same shape and size as panel 112. Panel 180 comprises six sides 180*a*, 180*b*, 180*c*, 180*d*, 180*e*, 180*f*. Side 180*a* extends along the upper surface of the hopper 100 and side 180*f* extends along the lower end of the upper portion 'A' of the hopper 100. Sides 180*b*, 180*c* are significantly shorter than sides 180*d*, 180*e*. Using sides 180*d*, 180*e* the flat panel 180 tapers down and reduces from a wider length at side 180*a* down to a shorter length at side 180*f*. Importantly, the panel 180 is inclined outwards from the central axis 'Y' in the direction of travel of the bulk material. The degree of inclination outwards from vertical axis 'Y' may range from about 2 degrees—about 45 degrees. A preferred degree of inclination outwards is about 5 degrees—about 20 degrees.

FIGS. 2 and 4 also clearly show that there is an access hatch 162 located on the panel 180. The access hatch 162 is an optional feature and allows access to the inside of the hopper 100.

Figure 8:
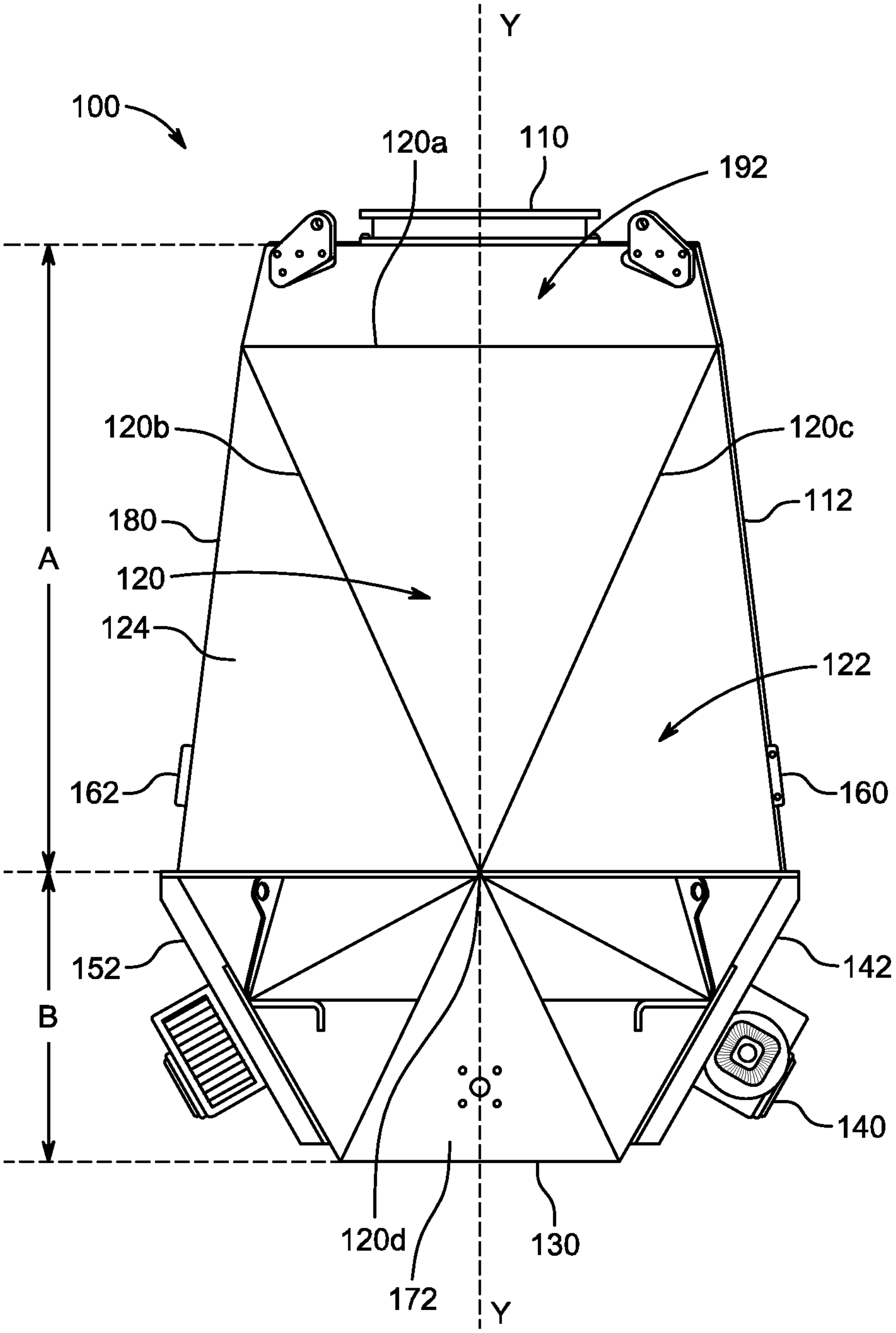
FIG. 8 is a side view of the other side of the hopper shown in FIG. 7 according to an embodiment of the present invention.

FIGS. 2 and 8 clearly show a further side of the hopper 100. This side of the hopper 100 is mainly made up again of three triangular areas which are in a series of panels 120, 122, 124. It is important to note that panel 120 similar to panels 112, 114, 180 points outwards and away from the central axis 'Y' in the direction of travel of the bulk material. The degree of inclination outwards from the central axis 'Y' in the direction of travel of the bulk material ranges from about 2 degrees—about 45 degrees. A preferred degree of inclination outwards is about 5 degrees—about 20 degrees.

Panel 120 comprises a side 120*a* located up towards the inlet 110 and two sides 120*b*, 120*c* extending and tapering down to a point 120*d* at the intersection between the upper portion 'A' and the lower portion 'B'. There is also shown in the side a flat panel 192 extending along the side 114*a* of the triangular panel 114. The panel 192 also extends outwardly away from the central axis 'Y' in the direction of travel of the bulk material.

The triangular panel 120 has a degree of inclination outwards from the central axis 'Y' in the direction of travel of the bulk material from about 2 degrees—about 45 degrees. A preferred degree of inclination outwards is about 5 degrees—about 20 degrees.

As shown above, in the upper portion 'A' of the hopper 100 the majority of the panels extend outwards and away from the central axis 'Y' in the direction of travel of the bulk material. As indicated above, this is known as having panels at a 'negative angle'.

We now refer to the lower portion CB' of the hopper 100.

The lower portion CB' of the hopper 100 is shown in all the FIGS. 1 to 11. On opposite sides of the lower portion CB' of the hopper 100 there are two agitators 140, 150. Any form of agitators may be used which are capable of providing stirring and/or disrupting and/or wiping (i.e. scraping) and/or vibrations to the inner sides of the hopper 100. In addition, although two agitators 140, 150 are shown any number or a plurality of agitators may be used which are located on the lower portion CB' of the hopper 100.

In particular, we refer to FIGS. 1, 3, 4, 5, 7 and 8 which show that agitator 140 is located on a flat planar or substantially planar panel 142. In comparison to the majority of the panels in the upper portion 'A' of the hopper 100, panel 142 is inclined in towards the central axis 'Y' of the hopper 100 and is intended to feed material into the outlet 130. The panel 142 therefore extends inwardly towards the central axis 'Y' in the direction of travel of the bulk material.

The agitator 140 is substantially centrally located on the panel 142. However, the agitators of the present invention can be located on any outer or inner surface location of the lower portion CB' of the hopper 100 which extend inwardly towards the central axis 'Y' in the direction of travel of the bulk material.

The panel 142 extends inwardly towards the central axis 'Y' in the direction of travel of the bulk material. The panel 142 therefore is inclined in towards and directs bulk material to the outlet 130. This may therefore be described as a 'positive angle'. The degree of inclination in towards from a vertical central 'Y' axis may range from about 10 degrees—about 45 degrees. A preferred degree of inclination inwards is about 20 degrees—about 40 degrees.

On referring to FIGS. 2, 4, 6, 7 and 8 there is shown an agitator 150 opposite to the location of the agitator 140. The agitator 150 is located on the lower portion CB' of the hopper 100. In particular, the agitator 150 is located on a panel 152 which is inclined in towards the central axis of the hopper 100 and is intended to feed material into the outlet 130. The panel 152 therefore extends inwardly towards the central axis 'Y' in the direction of travel of the bulk material. This may therefore be described as a 'positive angle'. The degree of inclination in towards from a vertical central 'Y' axis may range from about 10 degrees—about 45 degrees. A preferred degree of inclination inwards is about 20 degrees—about 40 degrees.

It is an important feature of the present invention in that the agitators 140, 150 are located on inwardly inclined surfaces on the lower portion CB' of the hopper 100. The agitators 140, 150 are typically located externally otherwise they would lead to internal blockages of the bulk material.

The agitators 140, 150 produce disturbance in material to prevent long-term blockages of the bulk material and aid the flow of the bulk material towards the outlet 130. The agitators 140, 150 are important in providing a constant and reliable feet of material through the outlet 130.

FIGS. 5 and 6 also show that there are also flat panels 172, 174 on the other sides of the lower portion CB' of the hopper 100 which extend inwardly towards the central axis 'Y' in the direction of travel of the bulk material. The degree of inclination in towards from a vertical central 'Y' axis may range from about 10 degrees—about 45 degrees. A preferred degree of inclination inwards is about 20 degrees—about 40 degrees.

A further important feature of the hopper 100 is that due to the inclined inwardly pointing panel surfaces in the lower portion CB' of the hopper 100, the outlet 130 is smaller than the cross-sectional area between the upper portion CA' and the lower portion CB' of the hopper 100. Typically, the outlet 130 is about 30%-80% smaller than the cross-section of the area between the upper portion 'A' and the lower portion 'B' of the hopper 100. The example shown in the hopper 100 is that the outlet 130 is about 50% smaller than the intersection between the upper portion 'A' which has a majority of outwardly directed panels and the lower portion 'B' which has inwardly directed panels.

The purpose of the inwardly directed panels on the lower portion CB' not only facilitates the agitation process but also means that the bulk material is not perpendicular to the force of the agitators 140, 150. This means that the effectiveness of the agitation is increased and has been found to be significantly effective in preventing permanent blockages in the hopper 100.

A potential function of the hopper 100 is to act as a short-term storage or so-called buffer system to eliminate fluctuations in the amount/volume of material being fed and to avoid delays of any suitable type of feed system.

A further specific advantage of the hopper 100 described above is that by using a combination of the inwardly inclined and mainly outwardly directed panels in the upper portion 'A' and the inwardly directed panels in the lower portion 'B' this maximizes the volume capacity in relation to agitation requirements of the hopper 100 in comparison to hoppers with traditional and simple vertical sides. Moreover, due to the increase in volume capacity, this allows more efficient use of space on the conveying line and allows lower manufacturing costs.

A further advantage of the hopper 100 is that as shown in all of FIGS. 1 to 11 the panels on all sides are all flat or substantially flat which reduces manufacturing costs and also facilitates ease of manufacture. The flat surfaces are also highly effective in preventing blockages in the flow of the bulk material through the passageway 111.

Furthermore, by reducing the material pressure on the agitators 140, 150 with the inclined inwardly directed panel walls in the lower portion CB' has been found to improve the lifetime of the agitators 140, 150 and has also been found to allow more efficient removal of bulk material from the hopper 100.

The hopper 100 is designed to provide sufficient volume for short time storage of bulk material in a range of feeding devices. For example, the amount of bulk material held may range from about 1 $m^3$ to about 50 $m^3$.

The hopper 100 has also been found to provide a constant and reliable feed and be highly effective in preventing blockages with the throughput of the bulk material from the inlet 110 down towards and out of the outlet 130.

Figure 9:
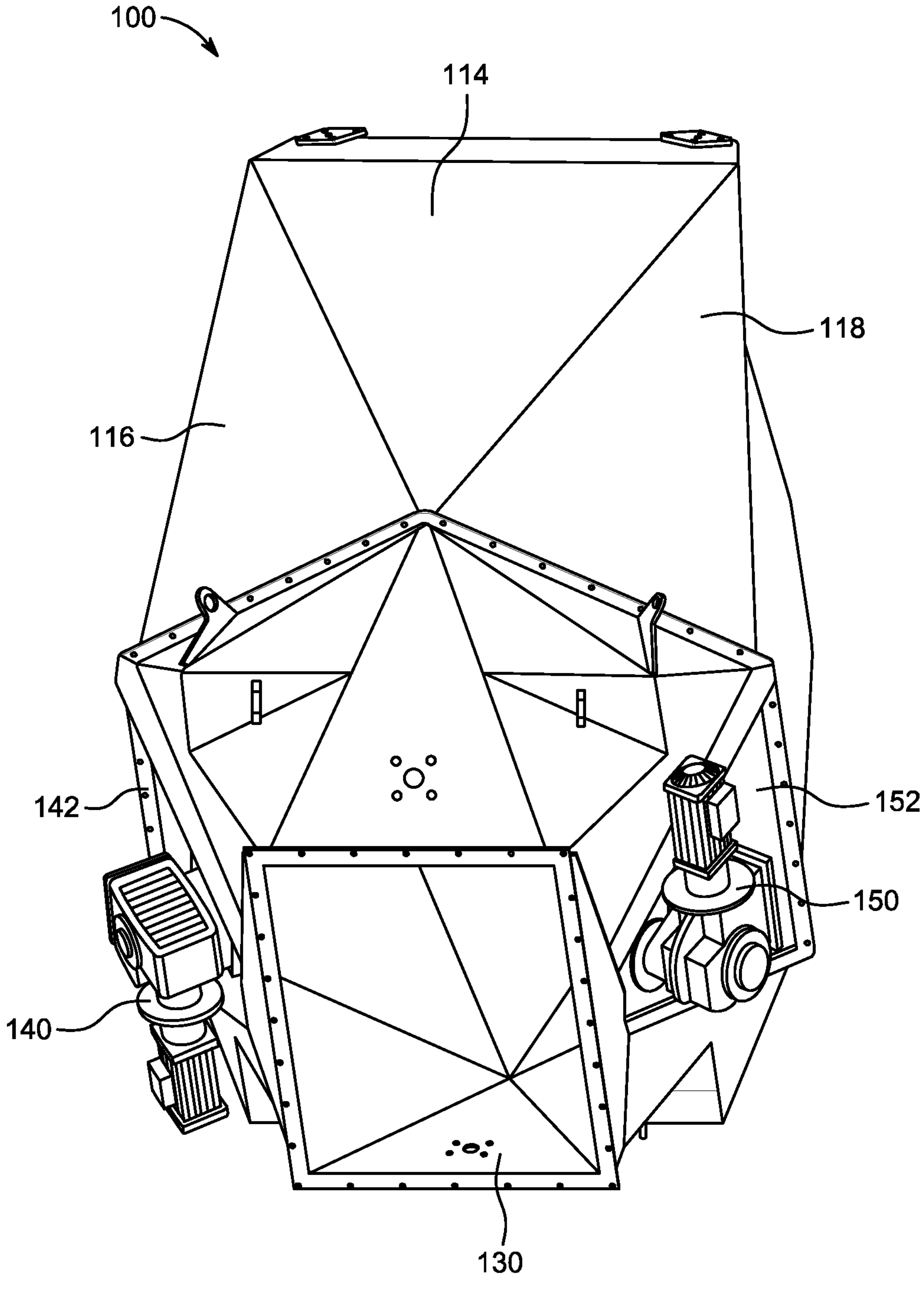
FIG. 9 is a perspective bottom view of the hopper shown in FIGS. 1 to 8 according to an embodiment of the present invention.

FIG. 9 is a perspective view showing the bottom of the hopper 100. The outlet 130 is clearly shown. As mentioned above, the outlet 130 is smaller than the cross-sectional area between the upper portion CA' and the lower portion CB' of the hopper 100.

Figure 10:
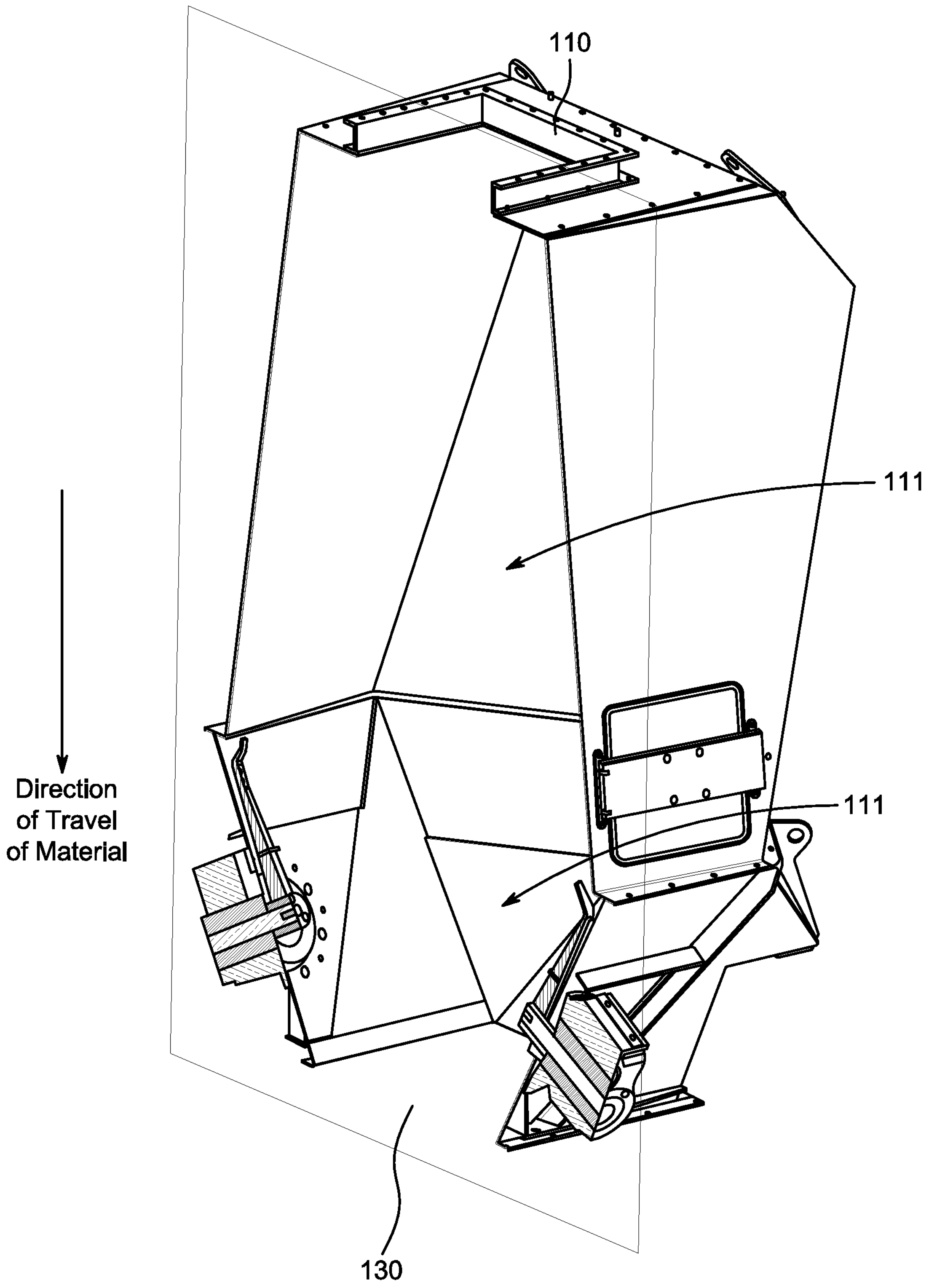
FIG. 10 is a sectional view of the hopper shown in FIGS. 1 to 9 according to an embodiment of the present invention.

FIG. 10 is a sectional view of the hopper shown in FIGS. 1 to 9. FIG. 10 clearly shows that the material will enter through the inlet 110 and exit should outlet 130. FIG. 10 also shows that there is a central passageway 111 extending from the inlet 110 to the outlet 130. The shape of the central passageway 111 is defined by the direction of the panels in the upper portion CA' and lower portion CB'.

It should be noted that all of the panels used in the construction of the hopper 100 are flat or substantially flat. FIG. 10 also clearly shows that the inside surface of the passageway 111 is smooth with the flat or substantially flat panel surfaces in both the upper portion CA' and lower portion CB'. It is preferred that at least one, a majority or all the panel surfaces in the upper portion CA' point outwards and away from the central axis 'Y' in the direction of travel of the bulk material. It is also preferred that at least one, a majority or all the panel surfaces in the lower portion CB' point inwards and towards from the central axis 'Y' in the direction of travel of the bulk material.

The use of flat panels facilitates both manufacture and reduces cost.

The hopper 100 is also highly symmetrical meaning that this reduces the different number of different components required to manufacture the hopper 100.

Although any suitable material may be used for the construction of the panels sheet metal and/or composite material is a typically preferred option.

Figure 11:
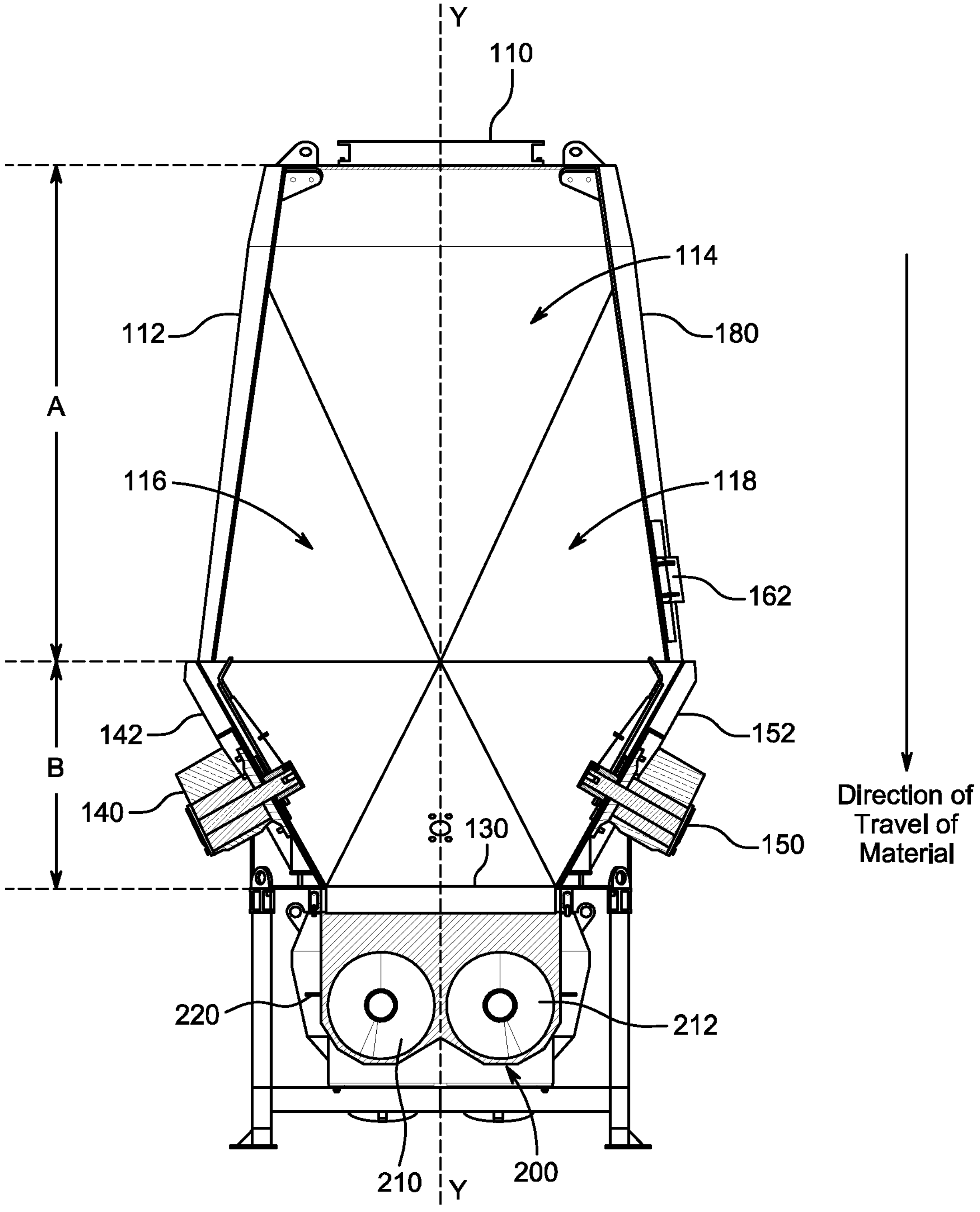
FIG. 11 is a sectional side view of the hopper shown in FIGS. 1 to 10 attached to part of a conveying/feeding system according to a further embodiment of the present invention.

FIG. 11 is a representation of the hopper 100 where there is a device 200 used to extract the bulk material exiting the outlet 130 in controlled way. There is shown a series of transport screws 210, 212 which are driven by a motor 220. However, it should be noted that the hopper 100 as described herein is highly suitable as providing a constant and reliable feed for a range of systems including any form of mechanical feed systems.

In use, bulk material is initially fed into the inlet 110. As indicated above, any type of bulk material may be used. The bulk material then enters the upper portion 'A' of the hopper 100. As explained above, at least one or a majority of the panels in the upper portion 'A' of the hopper 100 extend and are inclined outwards from the central axis 'Y' in the direction of travel of the bulk material. This has been found to be an important feature in preventing potential bridges and blockages in the hopper 100.

The bulk material then passes to the lower portion CB' where at least one or a majority of the panels extend inwardly towards the central axis 'Y' in the direction of travel of the bulk material. In combination with the material disturbance provided by the agitators 140, 150 such an arrangement has been found to be highly effective in preventing blockages and thereby providing a constant and reliable feed of bulk material.

A further advantage is that the load and torque exerted on the agitators 140, 150 is significantly reduced and by up to about 70% in comparison to hoppers with vertical straight sides. Such a system has also been found to maximize the available volume of material which can be fed into the hopper 100. By preventing any form of permanent blockage in the hopper this enables the time spent for bulk material in the hopper 100 to be kept to a minimum thereby increasing reliability and preventing forms of permanent blockage. Such a system also ensures a constant and reliable feed to subsequent, for example, any form of mechanical processing systems.

Whilst specific embodiments of the present invention have been described above, it will be appreciated that departures from the described embodiments may still fall within the scope of the present invention. For example, any suitable type of flat or substantially panels may be used in the construction of the hopper. Furthermore, the hopper may be used as part of a larger system such as a mechanical system for the supply of any form of material.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A hopper for feeding bulk material, the hopper comprising:

a main body having an upper portion and a lower portion;

an inlet located on an upper surface of the upper portion of the main body for bulk material to enter the hopper; and an outlet located on a lower surface of the lower portion of the main body for bulk material to exit the hopper, wherein the main body defines a substantially vertical passageway for bulk material, so that a direction of travel of the bulk material is from the inlet down substantially vertically through the outlet of the hopper, the vertical passageway having a centrally positioned substantially vertical axis passing through a center of the hopper from the inlet to the outlet, wherein each side of the upper portion of the main body has at least one or a plurality of substantially planar panel surfaces that are inclined outwardly away from the vertical axis in the direction of travel of the bulk material, wherein each side of the lower portion of the main body has at least one or a plurality of substantially planar panel surfaces that are inclined inwardly towards the vertical axis in the direction of travel of the bulk material to thereby assist transportation of the bulk material, wherein the hopper provides a substantially constant feed of bulk material through the outlet, wherein the at least one or the plurality of planar panel surfaces that are inclined outwardly directly adjoin the at least one or the plurality of planar panel surfaces that are inclined inwardly, and wherein the planar panel surfaces forming the upper portion of the hopper and that incline outwardly comprise at least a first set of panel surfaces and a second set of panel surfaces, wherein panel surfaces of the first set of panel surfaces have a different shape and a larger size than panel surfaces of the second set of panel surfaces.

2. The hopper for feeding bulk material according to claim 1, wherein on the upper portion of the main body of the hopper there is at least one or a plurality of flat or substantially flat planar panels which extend outwards away from the vertical axis of the hopper as the bulk material travels from the inlet through and out of the outlet, the at least one or the plurality of planar panels of the upper portion of the main body forming the at least one or the plurality of planar panel surfaces that are inclined outwards.

3. The hopper for feeding bulk material according to claim 2, wherein a majority of the planar panels forming the upper portion of the hopper extend outwards and away from the vertical axis of the hopper as the bulk material travels from the inlet through and out of the outlet.

4. The hopper for feeding bulk material according to claim 2, wherein the planar panels forming the upper portion of the hopper are substantially flat polygon shapes.

5. A hopper for feeding bulk material, the hopper comprising:

a main body having an upper portion and a lower portion;

an inlet located on an upper surface of the upper portion of the main body for bulk material to enter the hopper; and an outlet located on a lower surface of the lower portion of the main body for bulk material to exit the hopper, wherein the main body defines a substantially vertical passageway for bulk material to pass from the inlet down substantially vertically through the outlet of the hopper, wherein the upper portion of the main body has at least one or a plurality of substantially planar panel surfaces that are inclined outwards from a centrally positioned substantially vertical axis passing through the center of the hopper from the inlet to the outlet in a direction of travel of the bulk material, wherein the lower portion of the main body has at least one or a plurality of substantially planar panel surfaces that are inclined inwards towards the vertical axis passing through the center of the hopper from the inlet to the outlet in the direction of travel of the bulk material, wherein the hopper provides a substantially constant feed of bulk material through the outlet, wherein on the upper portion of the main body of the hopper there is at least one or a plurality of flat or substantially flat planar panels which extend outwards away from the vertical axis of the hopper as the bulk material travels from the inlet through and out of the outlet, the at least one or the plurality of planar panels of the upper portion of the main body forming the at least one or the plurality of planar panel surfaces that are inclined outwards, and wherein the planar panels forming the upper portion of the hopper comprise two six-sided flat panels and two triangular flat panels which are smaller than the two six-sided flat panels, wherein each of the two six-sided flat panels and the two triangular flat panels are inclined outwards from the vertical axis of the hopper as the bulk material travels from the inlet through and out of the outlet.

6. The hopper for feeding bulk material according to claim 2, wherein the at least one or the plurality of planar panels forming the upper portion of the hopper and extending outwards and away from the vertical axis of the hopper are inclined outwards in a range from about 2 degrees to about 45 degrees.

7. The hopper for feeding bulk material according to claim 1, wherein the upper portion of the hopper is longer in height extending down the vertical axis of the hopper than the lower portion of the hopper.

8. The hopper for feeding bulk material according to claim 7, wherein the upper portion of the hopper is about 1 to 5 times or 2 to 5 times the height of the lower portion of the hopper.

9. The hopper for feeding bulk material according to claim 1, wherein on the lower portion of the hopper there is at least one or a plurality of agitators capable of providing stirring and/or pulsing and/or vibration and/or disrupting and/or wiping and/or scraping to the lower portion of the hopper which facilitates the flow of the bulk material to the outlet of the hopper.

10. The hopper for feeding bulk material according to claim 1, wherein there is at least one agitator located on a planar panel surface of the lower portion of the hopper or there are two or more agitators located on planar panel surfaces on opposite sides of the lower portion of the hopper, and wherein the at least one agitator is a wiping agitator or the two or more agitators are wiping agitators that disrupt and/or dislodge bulk material on inner surfaces of the hopper.

11. The hopper for feeding bulk material according to claim 1, wherein on the lower portion of the hopper, there is a plurality of substantially flat planar panels, wherein a majority or all of the planar panels forming the lower portion of the hopper are inclined in towards the vertical axis of the hopper and therefore extend inwardly towards the vertical axis in the direction of travel of the bulk material, the planar panels forming the lower portion of the hopper and being inclined towards the vertical axis forming the planar panel surfaces that are inclined inwards.

12. The hopper for feeding bulk material according to claim 11, wherein a degree of inclination of the planar panels forming the lower portion ranges from about 10 degrees to about 45 degrees.

13. The hopper for feeding bulk material according to claim 9, wherein the agitators on the lower portion of the hopper are located on planar panels forming the lower portion which are inclined in towards the vertical axis of the hopper and are therefore located on planar panels which extend inwardly towards the vertical axis in the direction of travel of the bulk material.

14. The hopper for feeding bulk material according to claim 13, wherein a degree of inclination of the planar panels forming the lower portion ranges from about 10 degrees to about 45 degrees.

15. The hopper for feeding bulk material according to claim 1, wherein the outlet of the hopper is about 30% to 80% smaller than a cross-section of an area between the upper portion and the lower portion of the hopper.

16. The hopper for feeding bulk material according to claim 1, wherein the upper portion and lower portion of the hopper are made from planar panels that are flat or substantially flat and form a flat and/or smooth surface for the passageway passing through the hopper.

17. The hopper for feeding bulk material according to claim 16, wherein the planar panels forming the upper and/or lower portions are formed from sheet metal and/or composite material and/or alloy.

18. The hopper for feeding bulk material according to claim 16, wherein the planar panels forming the upper and/or lower portions form a smooth inner surface for material to pass through the hopper from the inlet to the outlet with a minimum amount of friction and/or resistance and to thereby prevent any blockages of bulk material.

19. The hopper for feeding bulk material according to claim 1, wherein there are at least one or a plurality of agitators located on the lower portion.

20. A method of providing a substantially constant feed of bulk material, the method comprising:

providing a main body having an upper portion and a lower portion;

providing an inlet located on an upper surface of the upper portion of the main body for bulk material to enter the hopper; and providing an outlet located on a lower surface of the lower portion of the main body for bulk material to exit the hopper, wherein the main body defines a substantially vertical passageway for bulk material, so that a direction of travel of the bulk material is from the inlet down substantially vertically through the outlet of the hopper, the vertical passageway having a centrally positioned substantially vertical axis passing through a center of the hopper from the inlet to the outlet;

wherein each side of the upper portion of the main body has at least one or a plurality of substantially planar panel surfaces that are inclined outwardly away from the vertical axis in the direction of travel of the bulk material, wherein each side of the lower portion of the main body has at least one or a plurality of substantially planar panel surfaces that are inclined inwardly towards the vertical axis in the direction of travel of the bulk material to thereby assist transportation of the bulk material, and wherein the at least one or the plurality of planar panel surfaces that are inclined outwardly directly adjoin the at least one or the plurality of planar panel surfaces that are inclined inwardly, and wherein the planar panel surfaces forming the upper portion of the hopper and that incline outwardly comprise at least a first set of panel surfaces and a second set of panel surfaces, wherein panel surfaces of the first set of panel surfaces have a different shape and a larger size than panel surfaces of the second set of panel surfaces.

21. A conveying system comprising a hopper according to claim 1.

22. The conveying system according to claim 21, wherein the conveying system is part of a mechanical conveying system for burning household and/or industrial waste.

* * * * *